United States Patent [19]

Johnson et al.

[11] Patent Number: 5,615,529
[45] Date of Patent: Apr. 1, 1997

[54] BORDER BLOCKS FOR TREE AND SHRUB DECORATION

[76] Inventors: Jan C. Johnson; Joel S. Johnson, both of 1311 W. Magnolia Ave., Sea Girt, N.J. 08750

[21] Appl. No.: 614,065

[22] Filed: Mar. 12, 1996

[51] Int. Cl.$^6$ .................................................. E04C 1/10
[52] U.S. Cl. ................................. 52/604; 52/606; 47/33
[58] Field of Search ............................. 52/604, 606, 102, 52/592.6, 592.1; 47/33; 404/7, 8; 405/284, 286

[56] References Cited

U.S. PATENT DOCUMENTS

| | | | |
|---|---|---|---|
| 5,214,897 | 6/1993 | Nordberg | 52/DIG. 9 X |
| 5,337,527 | 8/1994 | Wagenaar | 52/604 X |
| 5,361,557 | 11/1994 | Snyder et al. | 52/604 X |
| 5,421,135 | 6/1995 | Stevens et al. | 52/604 |
| 5,471,808 | 12/1995 | De Pieri et al. | 52/604 X |
| 5,505,034 | 4/1996 | Dueck | 405/286 X |
| 5,537,796 | 7/1996 | Kliethermes, Jr. | 52/606 X |

*Primary Examiner*—Lanna Mai
*Attorney, Agent, or Firm*—Charles I. Brodsky

[57] ABSTRACT

The border blocks of the invention include a plurality of hollow plastic blocks fillable through push-cap openable holes at their top with sand and employing various tongue-and-groove interlocks extending from the left and right sides thereof to join with similar adjacent blocks—whether linear or curved—and with the individual blocks also being provided with apertures at their bottom to mate with projections as part of the push-cap openable holes so as to stack one atop the other in forming several courses of block and in which the blocks forming the bottom course incorporate a tie-down arrangement for securement to the ground.

10 Claims, 4 Drawing Sheets

5,615,529

1

BORDER BLOCKS FOR TREE AND SHRUB DECORATION

FIELD OF THE INVENTION

This invention relates to building blocks and, more particularly, to such blocks which may serve in decorating trees and shrubs with a surround border in which flowers or other plants may be grown, where desired, or just to serve as a pleasing surround for the trees and shrubs enclosed therein where applicable.

BACKGROUND OF THE INVENTION

As is well known and understood, various plantings in the nature of flowers and trees are often highlighted by surrounding them with stones of various decorative size, shape and coloration. As is also known, over the course of time, such decorative stones frequently get knocked out of the display, being thus strewn about, and thereby presenting an unattractive appearance. Even where such stones do not get knocked about, over time they frequently shift due to their own weights and the ravages of weather, so that the placement of the stones tends to become uneven—with some of higher level from off the ground than others, and with some areas being more populated with the initially evenly distributed stones, than at other locations.

Although not thusly giving an optimum appearance, such use of decorative stones continues—if only as a result of its being a more economical alternative then constructing a bordering fence of larger heavier stones, one alongside the other and/or one atop the other, cemented into position. There, as is known to those skilled in the art, a permanent construction results, but one which is far more expensive to build, and one which, once in place, cannot be simply dismantled, if the tree or shrubbery should die, and the need results to remove and replace then. While the desirability of having a decorative fence construction of this type continues, a need exists to implement a structural design which is simpler to establish, more economical to construct, and easier to remove.

SUMMARY OF THE INVENTION

As will become clear from the following description, these objectives are attained, according to the invention, through the use of a plurality of hollow, plastic blocks fillable through push-cap openable holes at their top with sand—and then employing various tongue-and-groove interlocks extending from the left and right sides thereof to join with similar adjacent blocks—whether the blocks be linear or curved. As will also be seen, in those instances where it is desired to construct a decorative fence of greater height, various courses of these blocks can be erected one atop the other—in those instances, with the individual blocks also being provided with apertures at their bottom so as to mate with projections as part of the push-cap openable holes extending from the blocks which support it. In those instances where it is desired to provide greater support in surrounding the trees and shrubbery—and in holding it in position—, provision is provided with the border blocks of the invention to enable one course of blocks inside the other, to join the two together. With such embodiment—as well as with those where several courses of blocks are constructed one atop the other—, a further feature of the invention allows for the bottom most course to be anchored to the ground, as by means of spikes, where appropriate.

2

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
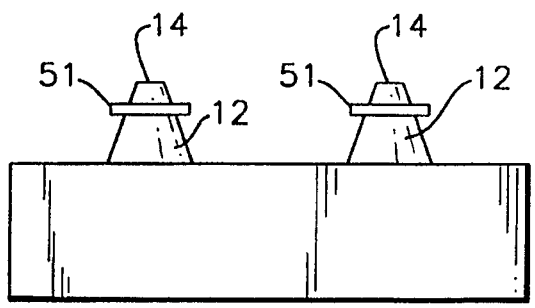
FIGS. 1–4 are front, top, bottom and side views of a straight length of border block embodying the teachings of the invention.
Figure 2:
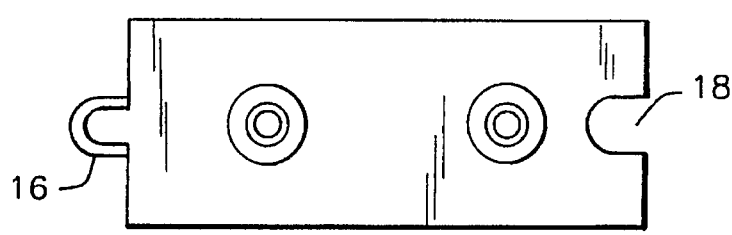
Figure 4:
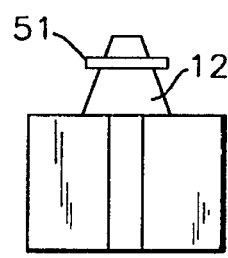
Figure 3:
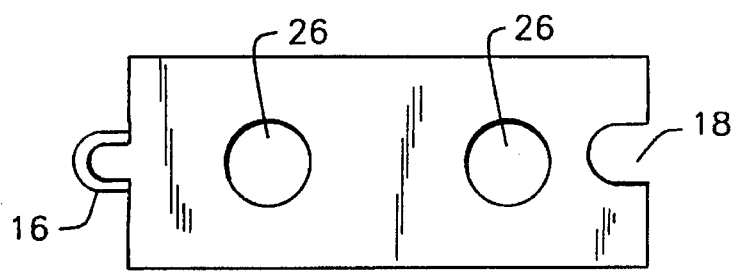
Figure 5:
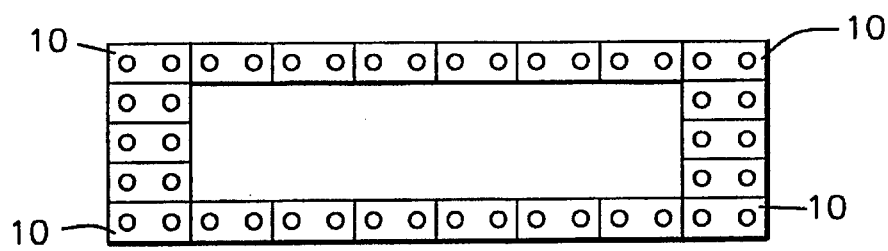
FIG. 5 illustrates a top view of a decorative fence of the type which can be constructed with the border blocks of FIGURES 1–4.
Figure 6:
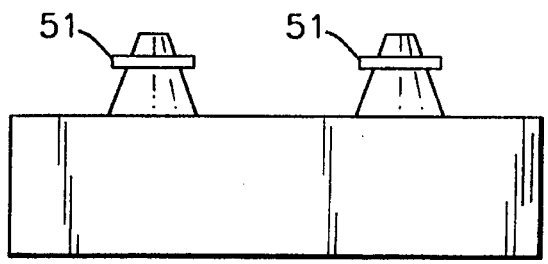
FIGS. 6–9 are front, top, bottom and side views of a straight length of border block embodying the teachings of the invention, as may be utilized when constructing the decorative fence of outer and inner sections, respectively.
Figure 7:
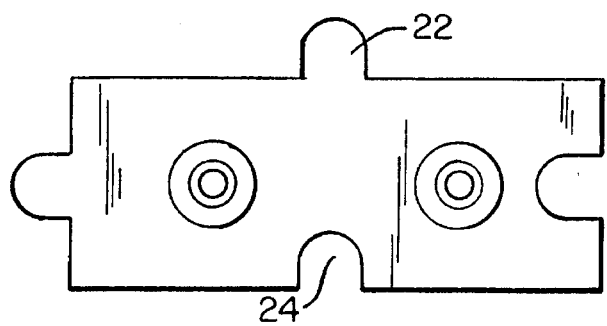
Figure 9:
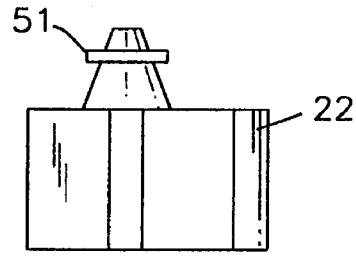
Figure 8:
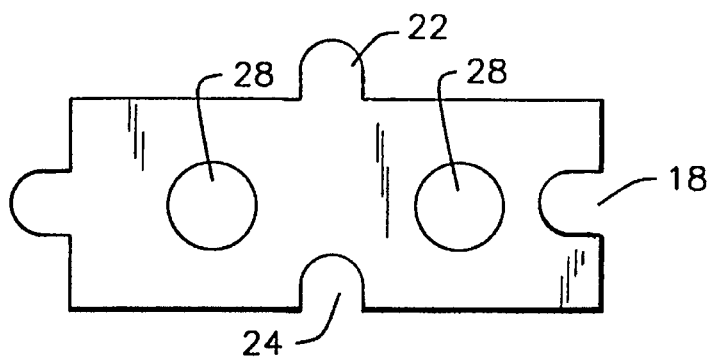

In the drawings, the border block 10 will be understood to be of hollow plastic composition, having a pair of projections 12 with openable holes 14 at their top for filling with sand. A projection 16 at one side is provided so as to mate with an opening 18 understood to be present in a next adjacent block to which the block 10 is to be connected, in tongue-and-groove fashion. When it is desired to install the block 10, it is merely carried, empty, to the location in question, placed in position, and the openable holes 14 cleared so as to accept the pouring in of sand, or other weighting material. Appropriate plantings may then be made of flowers, cactus, or otherwise, to be grown in the filling material, where desired. When a fence so formed by these individually placed and connected border blocks 10 is to be removed, it is but a simple matter to disconnect the block, empty its contents, and then carry the empty block to its new location, or to place it in storage. FIGS. 1–4 show such a block according to the invention, while FIG. 5 illustratively shows how they may may be positioned in forming a decorative fence 23 of linear or straight configuration.

Figure 10:
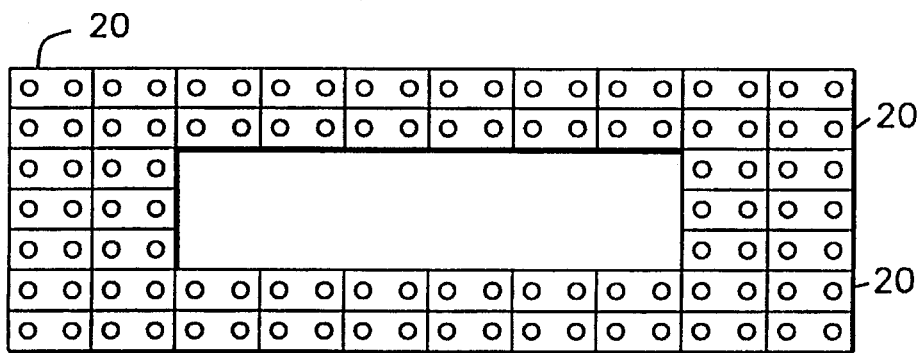
FIG. 10 illustrates a top view of a decorative fence of the type which can be constructed with the border blocks of FIGS. 6–9, in which inner and outer sections of border blocks are employed.

FIGS. 6–9 show these same views, but for a modified border block 20 which is intended to connect one such decorative fence inside another in providing added support as an alternative to having border blocks of wider dimension. As will be noted, these border blocks 20 provide an additional projection 22, and an additional opening 24 so that the two rows of blocks can be secured one alongside the other. FIG. 10, in this manner, shows a decorative fence 25 constructed of these two adjacent border block walls. In this decorative fence 25, the border blocks continue to be shown as being of linear, or straight section.

Figure 11:
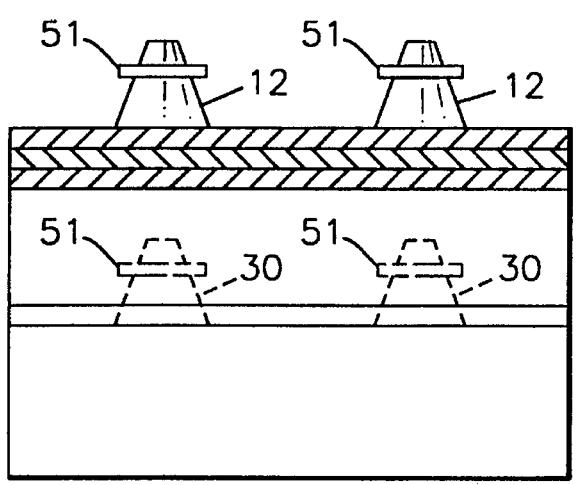
FIG. 11 is a front view, partially in section form showing how one block of the type shown in FIGS. 1–4, or of the type shown in FIGS. 6–9, could be stacked one-atop-the-other in forming two courses of block in forming the decorative fence.

FIG. 11, on the other hand, shows a sectional view of securing one row of blocks atop the other. There, normally-closed openings 26 present in the underside of the border block 10 in FIGS. 1–4, and normally-closed openings 28 in the underside of the border block 20 of FIGS. 6–9 are adapted to receive projections 30 extending from the underneath row of border block upon which they rest. In such construction, the lower row of blocks are first carried and placed into position, and then filled with sand or other weighting material—with the upper row of blocks then being placed in position so that the projections 30 penetrate the openings 26 (or 28), and then the upper course of block is filled with the sand or weighting material through its own projection 12. In this manner, not only can a greater height be provided to the decorative fence, but the weight of the upper course will be seen to further stabilize the lower course of blocks in position.

As with the border block 10 of FIGS. 1–4, the border block 20 of FIGS. 6–9, once filled, can be individually disconnected one from another, inverted to drop its weighted contents, and then carried to be stored or replaced elsewhere, or can be carried while still holding its weighted contents, as desired. It is similarly so with respect to the individual blocks of the two courses illustrated in FIG. 11.

Figure 12:
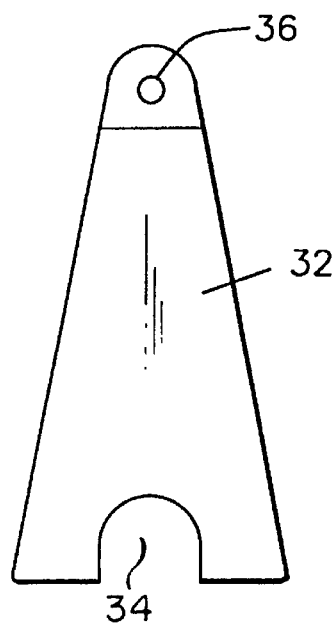
FIG. 12 represents a type of anchor used in securing one example of border block to the ground, in providing greater support, as where two or more courses of block are installed.
Figure 13:
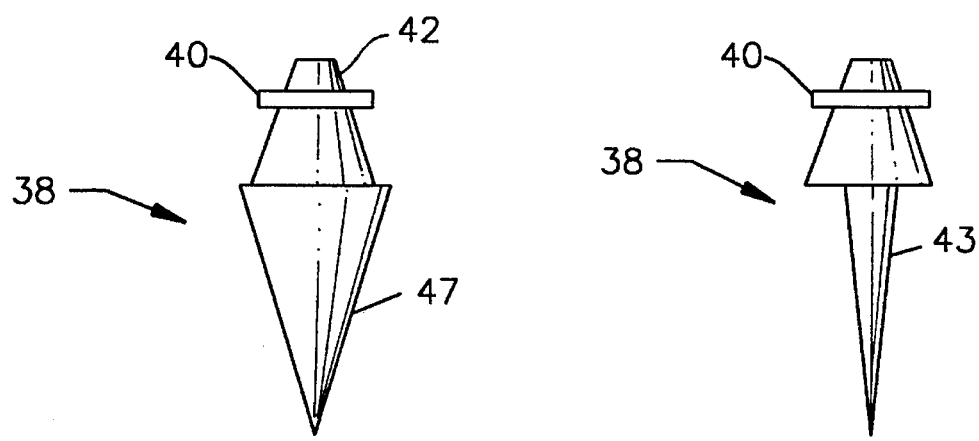
FIG. 13 illustrates a type of ground stake or spike, as may be employed with the anchor of FIG. 12.

Instances may arise, furthermore, where it is desired to additionally secure the fence in position—especially where it is constructed in several courses. In such instance, an anchor plate 32 may be employed (FIG. 12) in which an opening 34 is provided to receive a projection—as 22, in FIG. 7. At the opposite end of the anchor plate 32, a further opening 36 is afforded, through which a ground stake 38 or similar such spike (FIG. 13) may be inserted and pounded into the ground at spaced intervals in holding the border blocks of the lowermost course in position. An 0-ring 40 is shown in position in those instances where the stake 38 is first pounded into the ground, and the anchor plate 32 then placed atop it. In such instance, it will be appreciated that the diameter of the ground stake at 42 is less than the diameter of the opening 36 of the plate 32. In like manner, a second 0-ring 44 is shown in position in those instances where the stake 38 is pounded into the ground through the anchor plate 32. There it will be seen that the spiking portion 43 is of narrower diameter than the spoke portion 47. (In all these constructions, it will be understood that the holes 14 of projections 12 and 30 prior to use are normally capped-off, and are openable for the addition of sand or other weighted material, by pushing in on the cap closure of the holes 14, or in any other appropriate manner. The 0-ring 51 on the projections 12 and 30 are of a diameter to close the underside openings 26 and 28 against escape of the weighted material once those openings are penetrated by the projections extending upwardly from the blocks below.)

Figure 14:
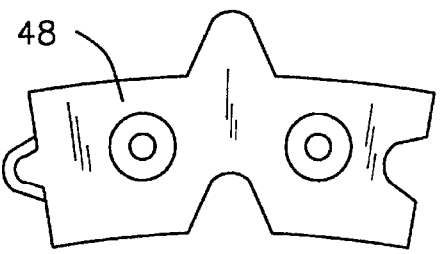
FIGS. 14 and 15 are top views of additional types of border blocks embodying the invention, though of curved length, differing one from another, and of differing arcs of curvature—but also embodying the teachings herein.
Figure 15:
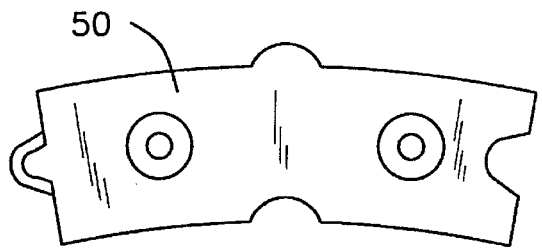
Figure 16:
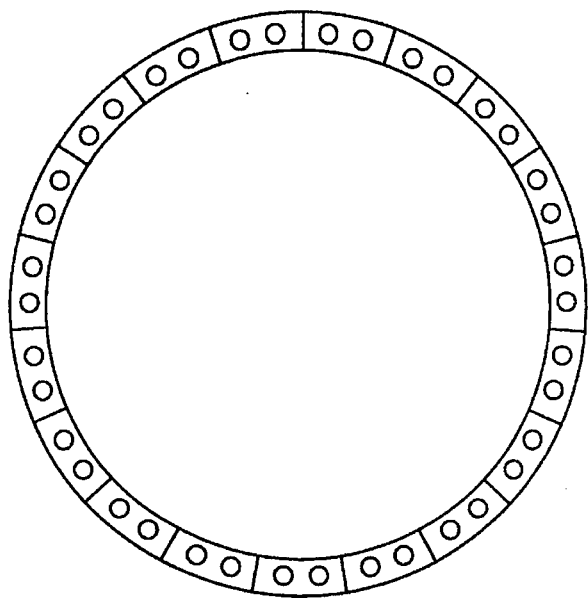
FIGS. 16 and 17 illustrate other configurations of decorative fence which can be constructed employing the example of border blocks according to the showings of FIGS. 14 and 15.
Figure 17:
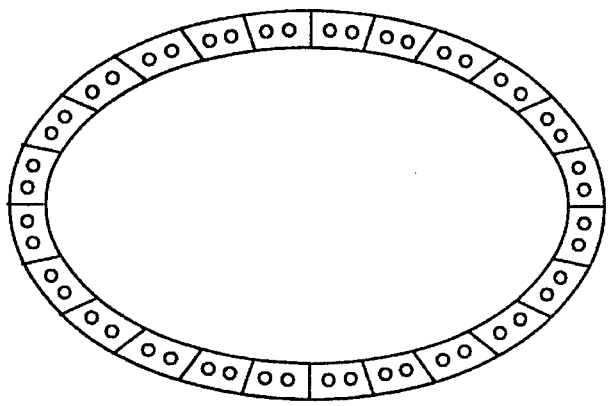

FIGS. 14 and 15, on the other hand, shows border blocks according to the invention, 48, 50, that are of a curved length, different one from another, and of likewise differing radius. In one embodiment of the invention, the border block 48 is of a shorter length, and of a typical 15° arc. The border block 50, however, may be of greater length, and of a 45° arc, for example. Both these border blocks 48 and 50 can be utilized in forming a different configuration for the decorative fence surrounding the trees or shrubs—as shown by the circular configuration of FIG. 16 and by the oval configuration of FIG. 17. As previously, each of the decorative fences of FIGS. 16 or 17 can be constructed of one or more courses—or even of border blocks of curved section with border blocks of linear or straight section, depending upon the size and shape of the decorative fence desired. As with the previously described border blocks, those of FIGS. 14 and 15 can likewise be carried to a location, put into position and then filled with sand or other weighted material—and then disconnected and selectively removed at any later date should circumstances so arise. As before, also, these border blocks can each be filled with any desired material, and can be filled, for example, with dirt where it is desired to plant flowers or similar such foliage as part of the decorative scheme for the trees and/or shrubs being surrounded.

While there have been described what are considered to be preferred embodiments of the present invention, it will be readily appreciated by those skilled in the art that modifications can be made without departing from the scope of the teachings herein. Thus, while particularly suited for decorating trees and shrubs, it will be understood that the border blocks of the invention can be used to surround any type of structure and around such items as traffic sign installations. Similarly, flexible tongue-and-groove or like interlocks may be employed at the sides and/or bottoms of the blocks to ease their alignment in assembling the fence installation. There, it might also be desired to thicken the ends of the blocks (as compared to their sides), to allow for a subsequent "shaving" of the ends to achieve an optimum fit on long, sweeping curve installations. At the same time, it might additionally be desirable to provide the tops of the blocks with surface indentations to facilitate their removal where large border plantings are intended to be incorporated within the surround being constructed. For at least such reasons, therefore, resort should be had to the claims appended hereto for a true understanding of the scope of the invention.

We claim:

1. Border blocks for tree and shrub decoration comprising a plurality of hollow plastic blocks having openable holes formed in a series of projections at their top for filing said blocks with sand, tongue-and-groove interlocks extending from their left and right sides to join with like adjacent blocks in forming a first course thereof, and with said blocks being provided with apertures at their bottom to mate with said projections of other blocks for stacking one atop the other in forming several courses of block.

2. The border blocks of claim 1, wherein said hollow blocks include a pair of projections with openable holes for filling said blocks with sand.

3. The border blocks of claim 1, wherein individual ones of said blocks are of straight and of arcuate configuration.

4. The border blocks of claim 3, wherein individual ones of said blocks are of a 15° curve.

5. The border blocks of claim 3, wherein individual ones of said blocks are of a 45° curve.

6. The border blocks of claim 1, wherein said openable holes are in the form of openable push-caps within said projections.

7. The border blocks of claim 1, wherein individual ones of said blocks for forming the lower most course thereof include means for securing said lower most blocks to the ground.

8. The border blocks of claim 7, wherein said securement means includes a spike for driving into the ground.

9. Border blocks for tree and shrub decoration comprising a plurality of hollow plastic blocks having openable holes formed in a series of projections at one surface thereof for filling said blocks with sand, tongue-and-groove interlocks extending from their left and right sides to join with like adjacent blocks in forming a first course of blocks, and with said blocks being provided with apertures at an opposing surface thereof to mate with said projections of other blocks for stacking one atop the other in forming several courses.

10. The border blocks of claim 9, wherein said openable holes are in the form of openable push-caps within said projections.

* * * * *